(12) United States Patent
West (10) Patent No.: US 10,492,385 B2
(45) Date of Patent: Dec. 3, 2019

(54) HIGHLY EFFICIENT PLANT IRRIGATION DEVICE AND METHOD FOR USING THE SAME

(71) Applicant: Tyler West, Costa Mesa, CA (US)

(72) Inventor: Tyler West, Costa Mesa, CA (US)

(*) Notice: Subject to any disclaimer, the term of this patent is extended or adjusted under 35 U.S.C. 154(b) by 476 days.

(21) Appl. No.: 15/281,693

(22) Filed: Sep. 30, 2016

(65) Prior Publication Data
US 2018/0000026 A1  Jan. 4, 2018

Related U.S. Application Data

(60) Provisional application No. 62/235,626, filed on Oct. 1, 2015.

(51) Int. Cl.
*A01K 27/00* (2006.01)
*A01G 27/00* (2006.01)
*A01G 9/02* (2018.01)

(52) U.S. Cl.
CPC .......... *A01G 27/005* (2013.01); *A01G 9/023* (2013.01)

(58) Field of Classification Search
CPC .......... A01G 9/00; A01G 9/005; A01G 9/023; A01G 9/022; A01G 9/006; A01K 27/00; A01K 27/005; A01K 27/006
See application file for complete search history.

(56) References Cited

U.S. PATENT DOCUMENTS

| | | | | |
|---|---|---|---|---|
| 4,899,487 A * | 2/1990 | Brownlee | ............. | A47F 7/0071 47/41.01 |
| 5,251,399 A * | 10/1993 | Rasmussen | ............ | A01G 9/023 211/88.03 |
| 5,826,375 A * | 10/1998 | Black | ...................... | A01G 9/023 47/67 |
| 9,839,183 B2 * | 12/2017 | Chang | .................. | A01G 27/005 |
| 2006/0231687 A1 * | 10/2006 | Cieri | ...................... | A01G 9/023 248/27.8 |
| 2017/0223904 A1 * | 8/2017 | Raccanello | ............ | A01G 9/247 |

FOREIGN PATENT DOCUMENTS

| | | | | |
|---|---|---|---|---|
| CA | 2911494 A1 * | 1/2016 | ............. | A01G 9/023 |
| DE | 1902681 A1 * | 8/1970 | ............. | A01G 9/022 |
| DE | 2537135 A1 * | 2/1977 | .......... | A01G 27/005 |
| EP | 0623276 A2 * | 11/1994 | ............. | A01G 9/023 |
| EP | 2845466 A1 * | 3/2015 | ............. | A01G 31/02 |

* cited by examiner

*Primary Examiner* — Monica L Williams
*Assistant Examiner* — Aaron M Rodziwicz
(74) *Attorney, Agent, or Firm* — Marcus C. Dawes (57) ABSTRACT

A device for efficiently irrigating a number of housing assemblies containing soil and plants. The housing assemblies are vertically mounted on a support structure. An irrigation system provides a flow of water to each of the housing assemblies. Each housing assembly includes an interior shell nested within an exterior shell. The irrigation system delivers the flow of water to two different heights of soil within the interior shell. A user may adjust how water is distributed within each housing assembly by manipulating one of several valves controlling the delivery of water from a main artery to each housing assembly. Water may be selectively and adjustably delivered to a plant containing a shallow root system, or to a different variety plant containing an extended or deep root system as needed. Excess water may be drained from the interior shell and held within a cavity for reabsorption by the soil contained therein.

9 Claims, 13 Drawing Sheets

HIGHLY EFFICIENT PLANT IRRIGATION DEVICE AND METHOD FOR USING THE SAME

RELATED APPLICATIONS

This application is related to provisional patent application, entitled "Highly Efficient Plant Irrigation Device," Ser. No. 62/235,626, filed on Oct. 1, 2015, under 35 USC 119, which is incorporated herein by reference.

BACKGROUND

Field of the Technology

The invention relates to the field of plant husbandry and more specifically to an irrigator receptacle for a growing medium.

Description of the Prior Art

During periods of drought or in areas with little excess water, it is critical to optimize water used for agricultural purposes. Current irrigation methods known in the art maintain plants in the ground by saturating the ground to ensure water reaches plan roots.

Problems with irrigation methods known in the art include excessive dispersal of water in the soil (i.e., waste) and evaporation. Water must pass through several inches of soil to reach plant roots, requiring amounts of water in excess of what actually reaches the plant.

What is needed therefore is an apparatus and method which makes it possible to directly water the root systems of plants and thus increase the efficiency of irrigation by decreasing the amount of water necessary to adequately grow food and other plants.

BRIEF SUMMARY

The invention is an apparatus for efficient irrigation including a support structure, a plurality of housing assemblies connected to the support structure, and an irrigation system attached to the support structure and inserted into each of the plurality of housing assemblies. The irrigation system inserted into each of the plurality of housing assemblies comprises an upper irrigation pipe disposed at a first height and a lower irrigation pipe disposed at a second height within each of the plurality of housing assemblies, the first height of the upper irrigation pipe being above the second height of the lower irrigation pipe.

In one embodiment, the each of the housing assemblies of the apparatus has an exterior shell, an interior shell that is nested within the exterior shell, and a cavity disposed between the exterior shell and the interior shell. Specifically the cavity is defined by an exterior wall of the exterior shell and an interior wall of the interior shell. The exterior shell further includes an exterior wall contour while the interior shell further comprises an interior wall contour, the exterior wall contour and the interior wall contour being configured to interact and locate the interior shell within the exterior shell. A plurality of shell feet may also be disposed between the interior shell and the exterior shell. Additionally, the interior shell comprises a plurality of drainage apertures and a plurality of handles disposed at each end.

In another embodiment, the support structure of the apparatus has a vertical mounting bar, a plurality of horizontal mounting bars coupled to the vertical mounting bar, and a plurality of attachment points disposed on each of the plurality of horizontal mounting bars. Optionally, each of the plurality of horizontal mounting bars are coupled to the vertical mounting bar with a hinge. The support structure further includes a plurality of mounting protuberances within each of the housing assemblies, each of which are configured to interlock with the plurality of attachment points disposed on any one of the plurality of horizontal mounting bars.

In another embodiment, the irrigation system of the apparatus of has a main artery coupled to the support structure and a plurality of angled manifolds coupled to the main artery, wherein each of the plurality of angled manifolds are orientated at an angle with respect to the main artery. In this embodiment, each upper irrigation pipe is disposed at a first height within each of the plurality of housing assemblies and is coupled to an upper end of each of the corresponding plurality of angled manifolds, while each lower irrigation pipe disposed at a second height within each of the plurality of housing assemblies is coupled to a lower end of each of the plurality of angled manifolds. Additionally, each of the plurality of angled manifolds may include an upper irrigation pipe valve disposed in its upper end and a lower irrigation pipe valve disposed in its lower end. At least one check valve may also be disposed in the main artery.

In an alternative embodiment, the irrigation system further includes a main artery coupled to the support structure and an assembly hose coupled to the main artery at one end and coupled to the upper irrigation pipe and the lower irrigation pipe at its opposing end.

The current invention also includes a method for efficient irrigation which includes directing a flow of water to a plurality of vertically mounted housing assemblies and by specifically directing the flow of water into an interior shell disposed within each of the plurality of vertically mounted housing assemblies. The flow of water is then directed to an upper or a lower portion of each of the plurality of vertically mounted housing assemblies and excess water is then drained from the interior shell.

In one embodiment directing the flow of water into the interior shell disposed within each of the plurality of vertically mounted housing assemblies includes directing the flow of water through an angled manifold and into an upper irrigation pipe and a lower irrigation pipe disposed in each interior shell for each of the plurality of housing assemblies. In this embodiment, each upper irrigation pipe is disposed at a first height and is coupled to an upper end of the angled manifold while each lower irrigation pipe is disposed at a second height and is coupled to a lower end of the angled manifold. Additionally, selectively distributing the flow of water to an upper or a lower portion of each of the plurality of vertically mounted housing assemblies may include closing a lower irrigation pipe valve disposed in the lower end of the angled manifold, or alternatively, closing an upper irrigation pipe valve disposed in the upper end of the angled manifold as is needed.

In an alternative embodiment, directing the flow of water into the interior shell disposed within each of the plurality of vertically mounted housing assemblies includes directing the flow of water through an assembly hose and into an upper irrigation pipe and a lower irrigation pipe disposed in each interior shell for each of the plurality of housing assemblies. In this embodiment each upper irrigation pipe is disposed at a first height while each lower irrigation pipe is disposed at a second height.

In yet another embodiment, the method step of draining excess water from the interior shell specifically entails draining excess water from the interior shell via a plurality of drainage apertures defined in a surface of the interior shell.

Finally, the method may also include collecting an excess flow of water in a cavity defined between the interior shell and an exterior shell of each of the plurality of housing assemblies and then draining said water through a drain plug disposed in the exterior shell.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 1b is a top down view of the plant irrigation system seen in FIG. 1a.

FIG. 1c is a side planar view of the plant irrigation system seen in FIG. 1a.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

FIGS. 1a-1c, 2, 3, and 6 illustrate perspective, partial top and side views, respectively, of a plant irrigation device 100.

Figure 1A:
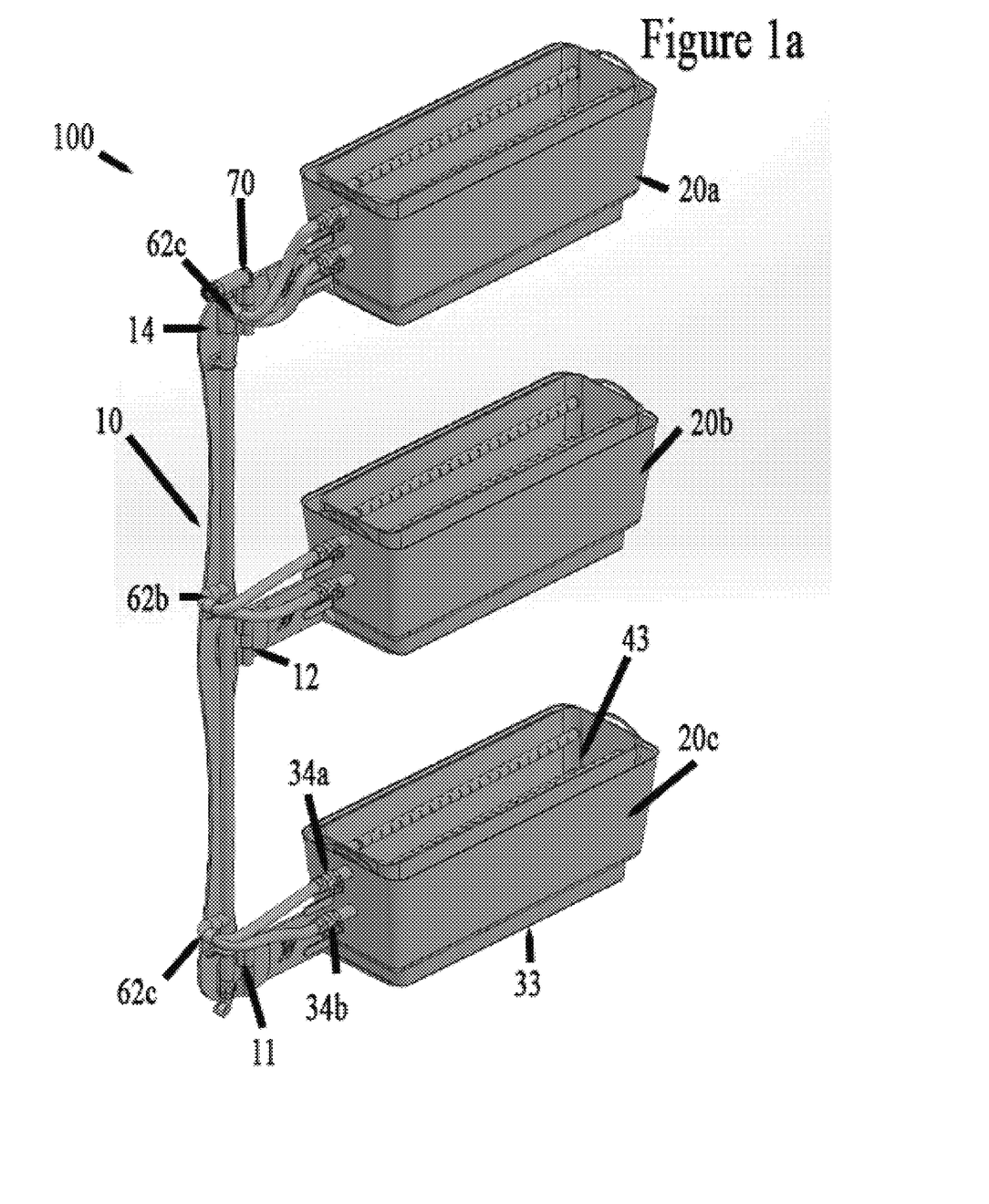
FIG. 1a is a perspective view of an embodiment of the plant irrigation system of the current invention comprising a plurality of housing assemblies of differing sizes.
Figure 1B:
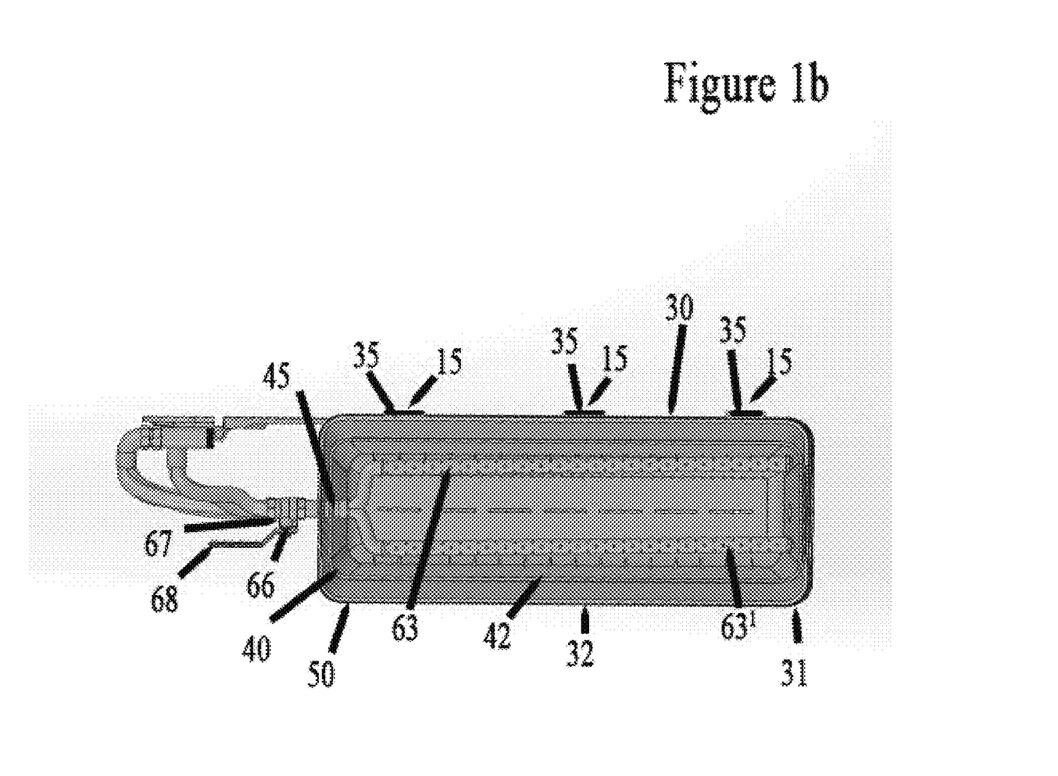
Figure 1C:
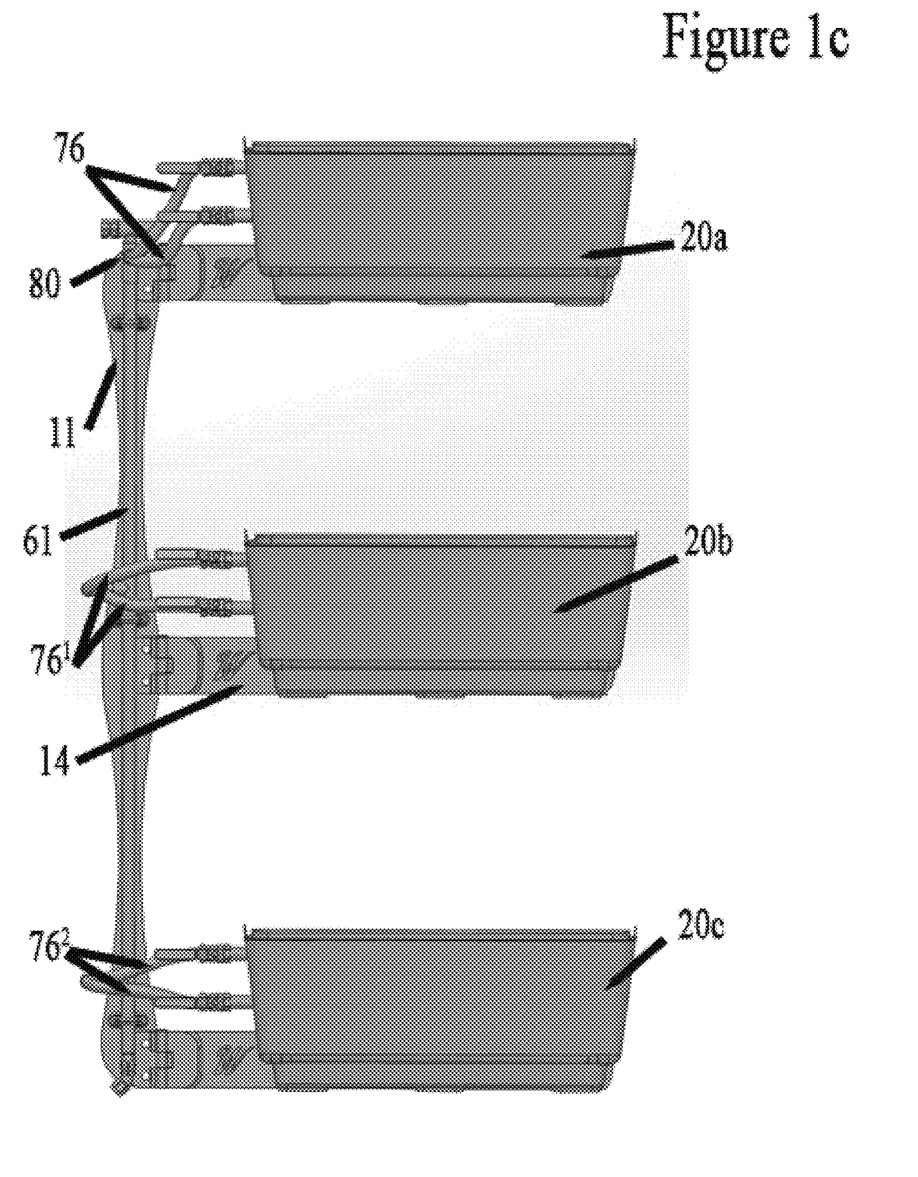
Figure 2:
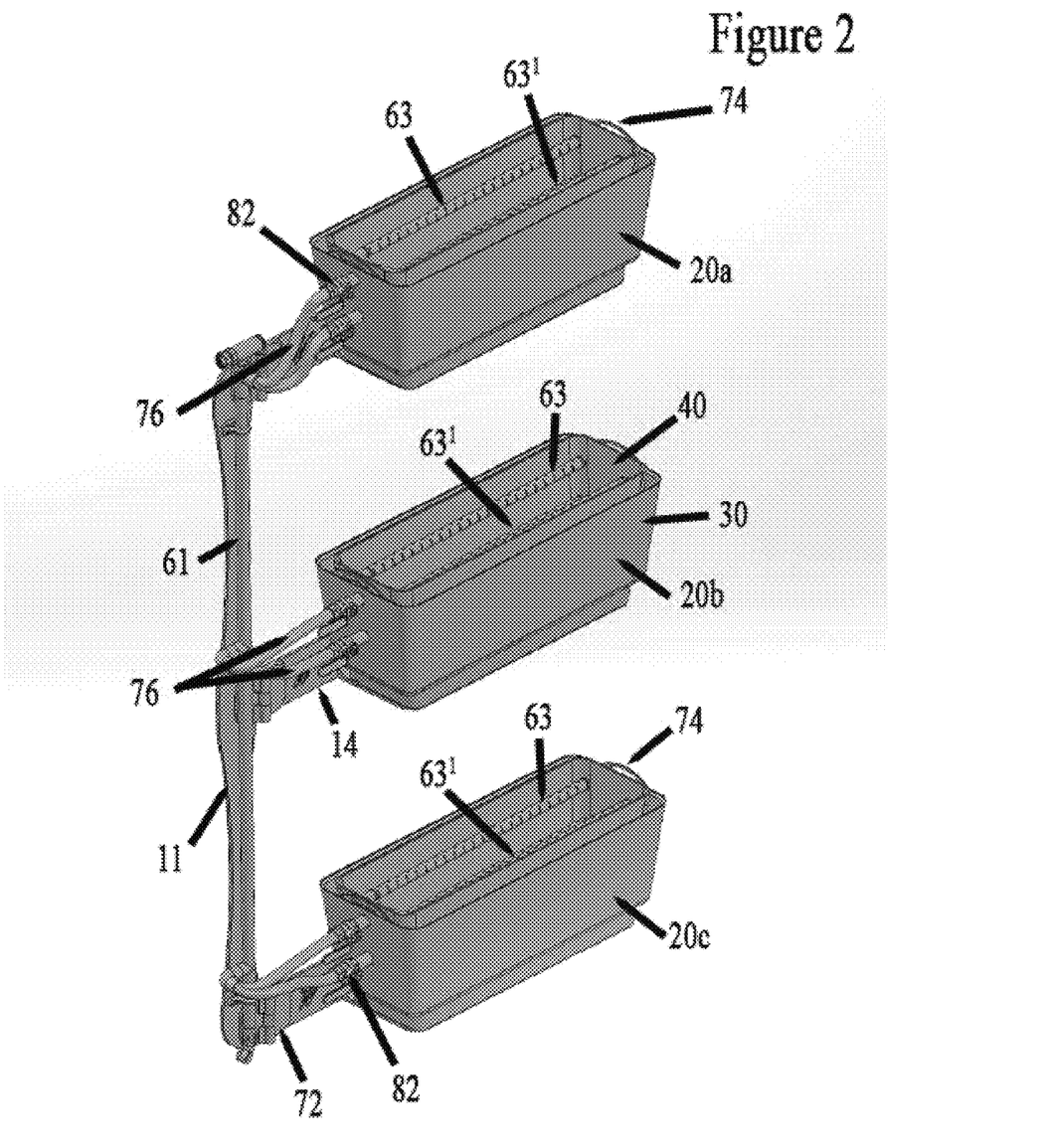
FIG. 2 is a rear perspective view of an alternative embodiment of the plant irrigation system.
Figure 3:
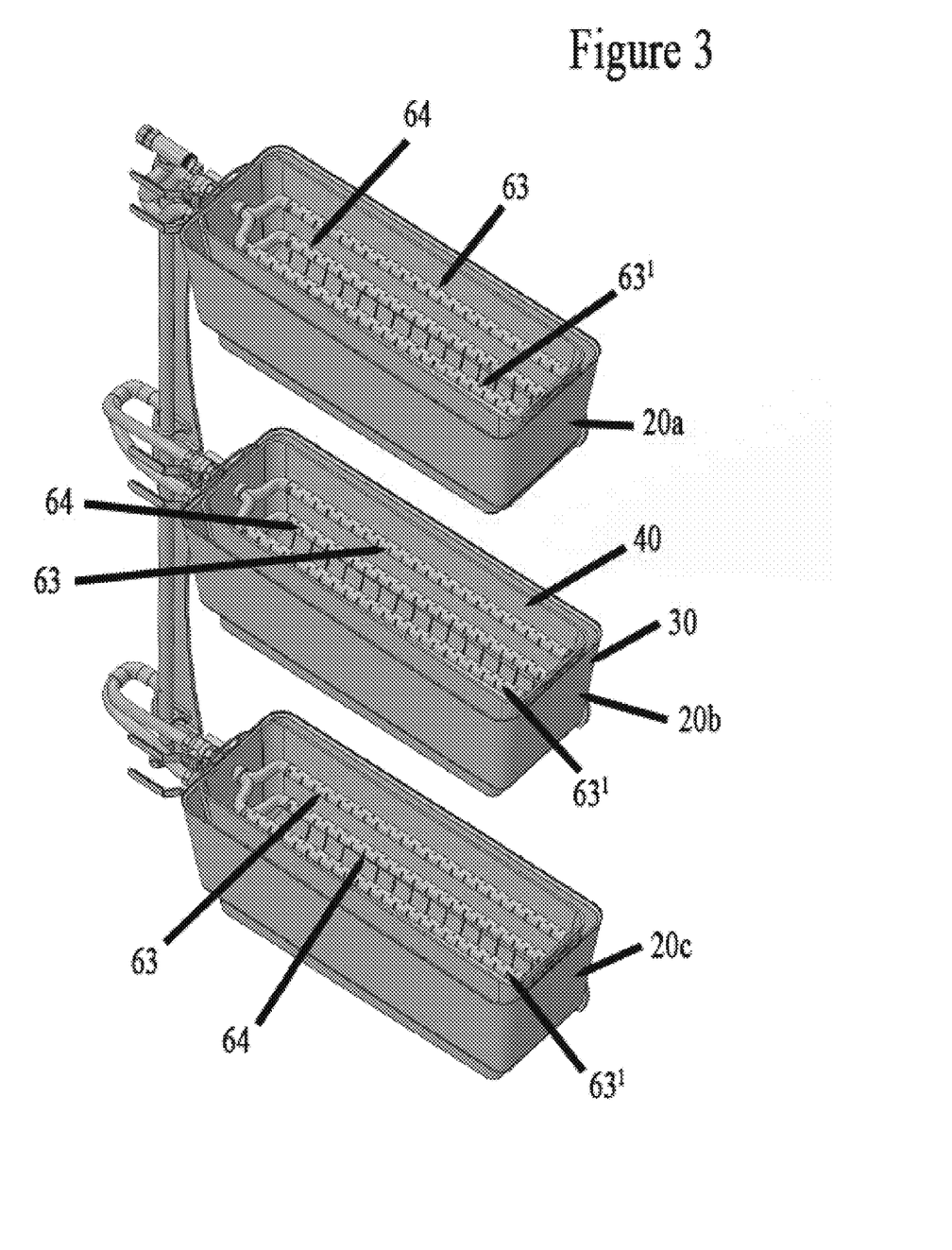
FIG. 3 is a frontal perspective view of the plant irrigation system seen in FIG. 2.

In this particular embodiment, the plant irrigation device 100 comprises a mounting frame assembly 10, and an irrigation system 60. FIGS. 1a-1c show one embodiment of the current invention comprising three separate housing assemblies 20a-20c of differing sizes, while FIGS. 2-11 show a separate embodiment of the current invention comprising four separate housing assemblies 20a-20d of the same size. Additionally, the embodiment shown in FIGS. 1a-1c show where each housing assembly 20a-20c comprises an upper irrigation pipe 63 and a lower irrigation pipe 64, while FIGS. 2-11 show for the separate embodiment that each housing assembly 20a-20d comprises at least two upper irrigation pipes 63, 63' disposed in parallel, and at least two lower irrigation pipes 64, 64' disposed in parallel and directly beneath the at least two upper irrigation pipes 63, 63'.

The mounting frame assembly 10 includes a vertical mounting bar 11, a plurality of mounting apertures 12 defined in the vertical mounting bar 11, and a plurality of horizontal mounting bars 14 orientated perpendicularly with respect to the vertical mounting bar 11. In one particular embodiment seen in FIG. 5, the mounting frame assembly 10 comprises a plurality of supports 13 and a plurality of hinges 72. Each of the plurality of supports 13 in turn comprises an angled support member 13' and a horizontal support member 13", the horizontal support member 13" being perpendicularly orientated with respect to each horizontal mounting bar 14. The plurality of hinges 72 couple each of the horizontal mounting bars 14 to the vertical mounting bar 11. The hinges 72 allow a user to manipulate the mounting frame assembly 10 by grabbing a selected horizontal mounting bar 14 or a housing assembly 20a-20d disposed thereon and rotating the horizontal mounting bar 14 outward or away from the remaining portions of the mounting frame assembly 10 or a structure on which the mounting frame assembly 10 is coupled.

The vertical mounting bar 11 is preferably comprised of metal, metal composites, plastic, or wood and is capable of bearing the weight of horizontal mounting bars 14, the housing assemblies 20a-20d, and the irrigation system 60. The vertical mounting bar 11 may be secured or coupled to an external support such as a wall, fence, or post through the mounting apertures 12 by means well known in the art. Each horizontal mounting bar 14 in turn has a plurality of attachment points 15 adapted to connect to the housing assemblies 20a-20d. In one preferred embodiment, attachment points 15 are molded or welded v-shaped protuberances that interlock with portions of the housing assemblies 20a-20d. In an alternative embodiment, each attachment point 15 is coupled to a housing assemblies 20a-20d with bolts or clamps or through direct attachment, such as welding, soldering, or adhesive. With each housing assembly 20a-20d coupled to each respective horizontal mounting bar 14, each housing assembly 20a-20d rests on a corresponding pair of horizontal support members 13" of each support 13.

Figure 6:
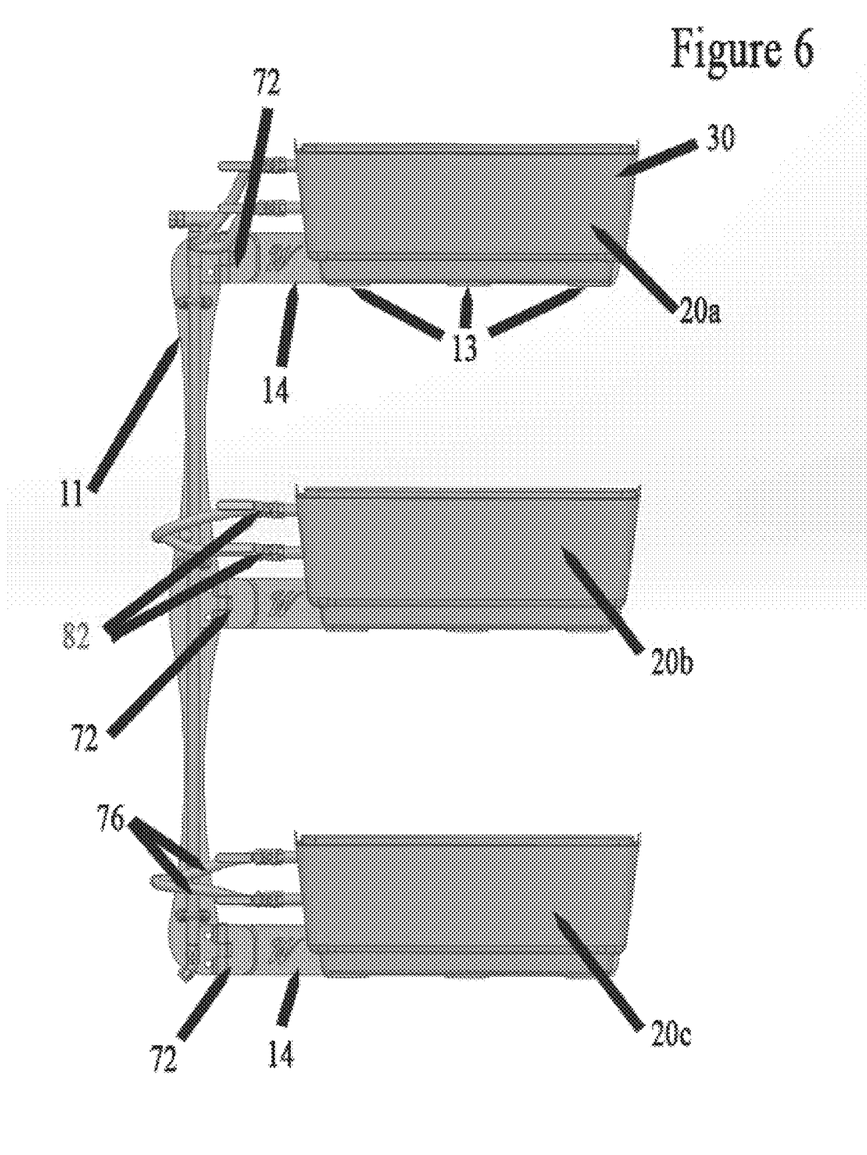
FIG. 6 is a side planar view of the plant irrigation system seen in FIG. 2.

Each housing assembly 20a-20c seen in FIGS. 1a-1c has a total height ranging from approximately 10 inches to approximately 12 inches. In one particular embodiment seen in FIG. 1c, the lowest or bottom most disposed housing assembly 20c in the plant irrigation device 100 comprises a first height that is larger than a second height of the middle housing assembly 20b. In turn, the highest or top most disposed housing assembly 20a comprises a third height that is smaller than both of the first height of the lowest housing assembly 20c and the second height of the middle housing assembly 20b. As a result, the relative size of each housing assembly 20a-20c decreases as a function of the housing assembly's 20a-20c position along the height of the vertical mounting bar 11. In this fashion the highest housing assembly 20a is the smallest, thus aiding the vertical mounting bar 11 and each horizontal mounting bar's 14 ability to adequately support each housing assembly 20a-20c. Alternatively, as seen in FIG. 6, each housing assembly 20a-20d may comprise a substantially similar size and shape.

Figure 4:
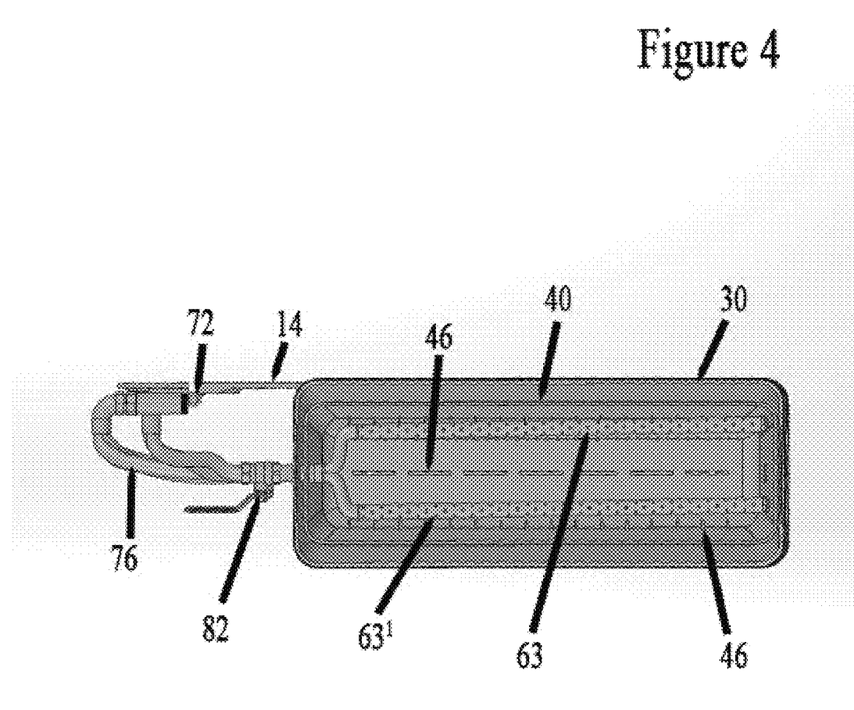
FIG. 4 is a top down view of the plant irrigation system seen in FIG. 2.
Figure 5:
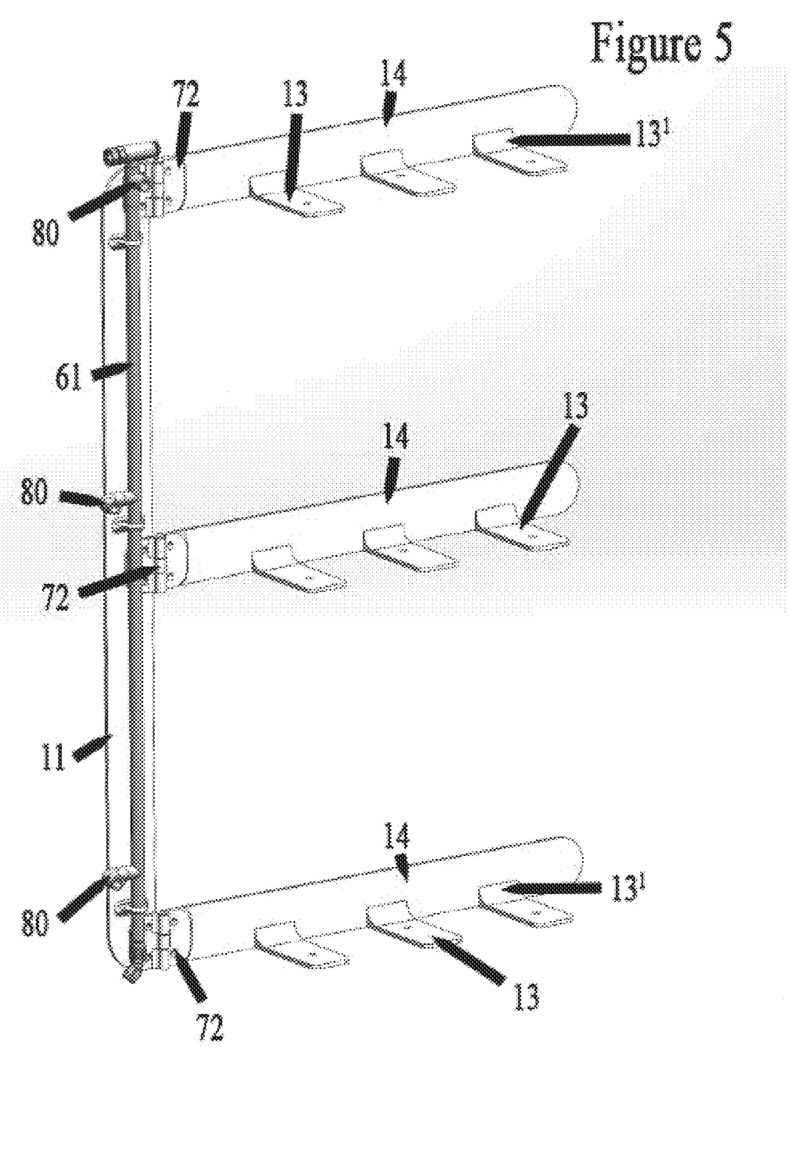
FIG. 5 is a perspective view of the support structure used to support the plant irrigation system seen in FIG. 2.

Each of the housing assemblies 20a-20d includes an exterior shell 30, an interior shell 40, and a cavity 50. The interior shell 40 nests within the exterior shell 30, thus forming the cavity 50 between the exterior shell 30 and the interior shell 40. The exterior shell 30 comprises an exterior wall 31, an exterior wall contour 32, an exterior shell floor 33, a set of exterior irrigation apertures 34a, 34b, and in one embodiment, a plurality of mounting protuberances 35. The interior shell comprises an interior wall 41, an interior wall contour 42, an interior shell floor 43, a plurality of interior shell feet 44 as seen in FIG. 9, a set of interior irrigation apertures 45a, 45b, and a plurality of drainage apertures 46 as seen in FIG. 4. In one embodiment seen in FIGS. 3 and 8, each interior shell 40 comprises a handle 74 disposed at each lateral end of the interior shell 40.

As seen in FIG. 1b, the exterior shell 30 has a closed, substantially elongated shape with an upper edge or lip. In one particular embodiment, the exterior shell 30 is substantially oval shaped. In another embodiment, the exterior wall contour 32 forms a concave indentation in the exterior wall 31. In yet another embodiment, the exterior wall contour 32 forms a convex protrusion in the exterior wall 31. A plurality of mounting protuberances 35 extend from at least one side of the exterior shell 30 to interlock with the corresponding plurality of attachment points 15.

The interior shell 40 has a closed, substantially elongated shape that is substantially identical to that of the exterior shell 30. In one embodiment, the interior wall contour 42 forms a concave indentation within the interior wall 41. In another embodiment, the interior wall contour 42 forms a convex protrusion within the interior wall 41. Interactions between the exterior wall contour 32 and the interior wall contour 42 serve to locate interior shell 40 within exterior shell 30 and create the cavity 50. The interior shell feet 44 as best seen in FIG. 9 raise the interior shell floor 43 above the exterior shell floor 33 to allow excess water to drain into the cavity 50 from the drainage apertures 46 in the interior shell floor 43. The interior shell 40 also drains excess water into the cavity 50 from the drainage apertures 46 in the interior wall 41. In one embodiment, the drainage apertures 46 are located in the lower half of the interior wall 41. In certain embodiments, the interior shell 40 may have a water-permeable, soil-impermeable lining to prevent soil egress into the cavity 50.

The cavity 50 is located between the exterior shell 30 and the interior shell 40. In one particular embodiment, the cavity 50 has a width of approximately 1.5 inches to approximately 2.5 inches.

Figure 7:
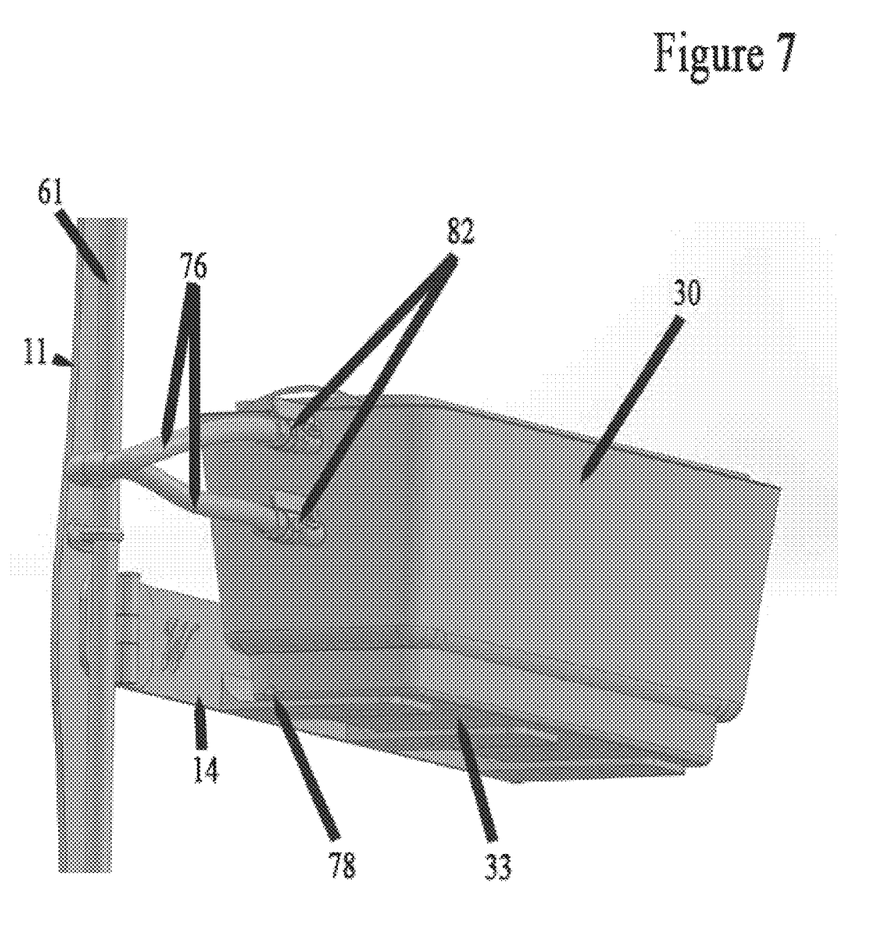
FIG. 7 is a magnified view of the coupling between the irrigation system and the top most housing assembly disposed in the plant irrigation system seen in FIG. 2.

As discussed above, the cavity 50 collects and holds the excess water introduced into the interior shell 40 which is not absorbed by the soil contained therein. As the soil or other growing matrix dries, water that is contained within the cavity 50 can be reabsorbed into the soil through the drainage apertures 46 defined within the interior shell 40. Alternatively, the exterior shell 30 may comprise a drain plug 78 as seen in FIG. 7 that is defined in the exterior shell floor 33 which may be opened or released at the user's discretion in order to drain any excess water from the cavity 50.

A first embodiment of the irrigation system 60 seen in FIGS. 1a-1c comprises a main artery 61, a plurality of angled manifolds 62a-62c, a plurality of upper irrigation pipes 63 and lower irrigation pipes 64, a plurality of upper irrigation pipe valves 66 and lower irrigation pipe valves 67, at least one check valve 70, and a plurality of overflow lines 71a-71c. The irrigation system 60 is preferably made from PVC pipe, however other materials suitable for transporting fluid such as rubber, metal, and the like may be used without departing from the original spirit and scope of the invention.

Returning to FIG. 1, the main artery 61 attaches at a first end to a water source, such as a hose or water pipe. Each angled manifold 62a-62c attaches to the main artery 61 at a different location along the main artery 61. Each upper irrigation pipe 63 attaches to an upper end of one of the angled manifolds 62a-62c. Each lower irrigation pipe 64 in turn attaches to a lower end of one of the angled manifolds 62a-62c. The upper irrigation pipes 63 and lower irrigation pipes 64 are located at levels to allow water output through multiple pipe apertures 65 (not shown). In one embodiment, both the upper irrigation pipes 63 and/or the lower irrigation pipes 64 have a water-permeable, soil-impermeable covering to prevent soil egress into the upper irrigation pipes 63 and/or the lower irrigation pipes 64.

The upper irrigation pipe valves 66 and the lower irrigation pipe valves 67 are also located at upper and lower ends of the angled manifolds 62a-62c, respectively. The upper irrigation pipe valves 66 and the lower irrigation pipe valves 67 control water flow out of the upper irrigation pipes 63 and the lower irrigation pipes 64, respectively. In one embodiment, the upper irrigation pipe valves 66 and lower irrigation pipe valves 67 are ball valves that are each controlled by a separate valve control lever 68. Rotation of the valve control lever 68 limits or cuts off water flow, allowing selective delivery of water through the upper irrigation pipe 63 and/or the lower irrigation pipe 64. For example, if a user wishes to water a plant with a short or shallow root system within the interior shell 40, the user manipulates the valve control lever 68 of a corresponding housing assembly 20a-20c and closes the lower irrigation pipe valve 67, thus preventing water from flowing from the main artery 61 into the lower irrigation pipe 64. With the lower irrigation pipe valve 67 closed, water will then only flow through the upper irrigation pipe valve 66 and the upper irrigation pipe 63, thus providing water directly to any root system adjacently located to the upper irrigation pipe 63. Conversely, if the user wishes to only water a deeper root system disposed near the bottom of the interior shell 40, the user closes the upper irrigation pipe valve 66 and opens the lower irrigation pipe valve 67, thus directing the flow of incoming water into and through the lower irrigation pipe 64.

The check valve 70 is located at an end of the main artery 61 opposite the water source. If excessive water buildup occurs within the main artery 61, overflow lines 71a-71c (not shown) transport excess water to the cavities 50 of each of the housing assemblies 20a-20c, respectively.

As discussed above, the irrigation system 60 allows a user to determine the level at which a plant's roots receive water. In one embodiment, an electronic controller may be coupled to the irrigation system 60, the electronic controller controlling water flow and any of valves in the irrigation system 60, allowing easier control, remote control, or programmed control over the irrigation system 60. In a further embodiment, the system may comprise multiple plant irrigation devices 100 that are interconnected with the fluid channels. In yet another embodiment, the plant irrigation device 100 the housing assemblies may be arranged in a horizontal orientation, including additional mounting frame assemblies, and additional or fewer housing assemblies as what is explicitly shown in the figures.

Figure 8:
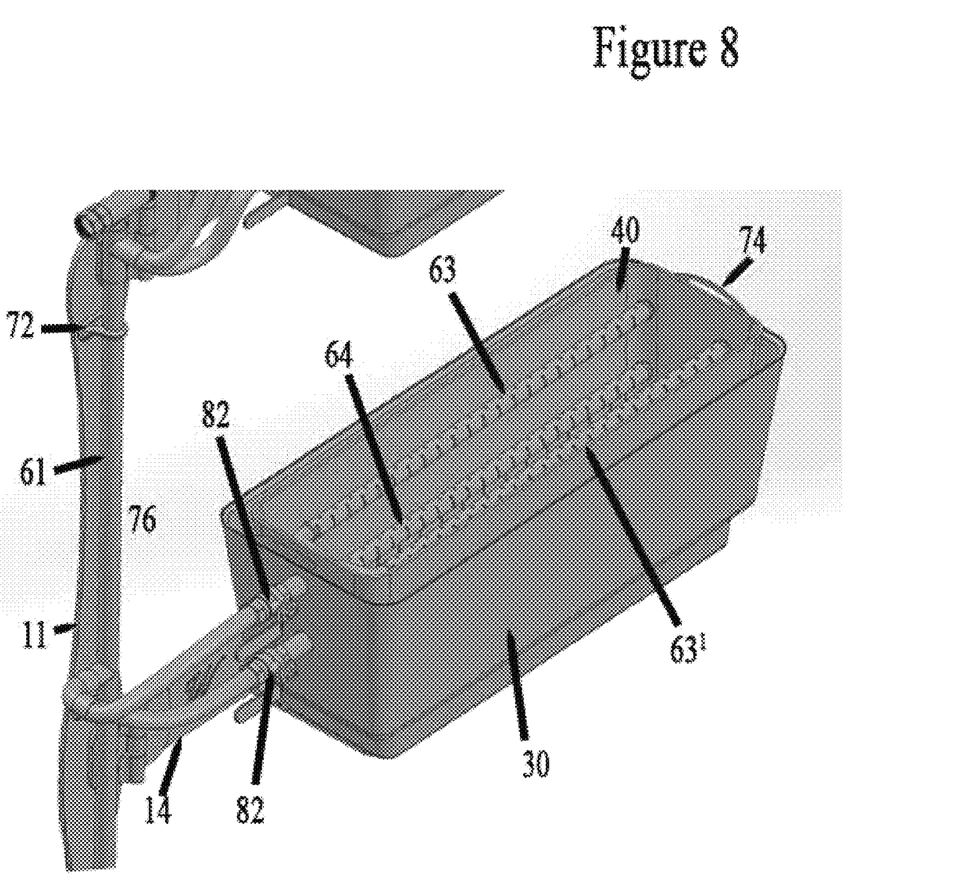
FIG. 8 is a magnified perspective of the coupling between the irrigation system and the bottom most housing assembly disposed in the plant irrigation system seen in FIG. 2.
Figure 9:
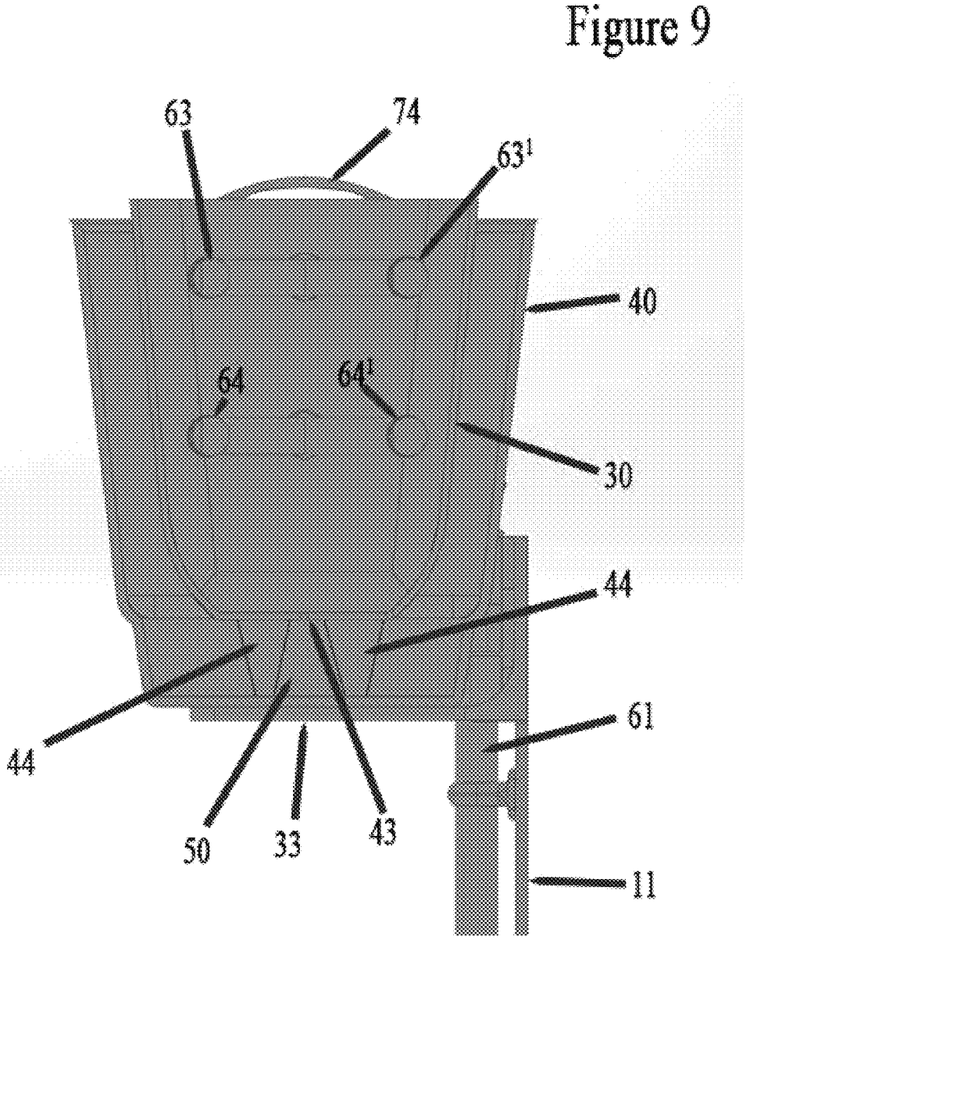
FIG. 9 is a cross sectional view of one of the plurality of housing assemblies of the plant irrigation system seen in FIG. 2.
Figure 10:
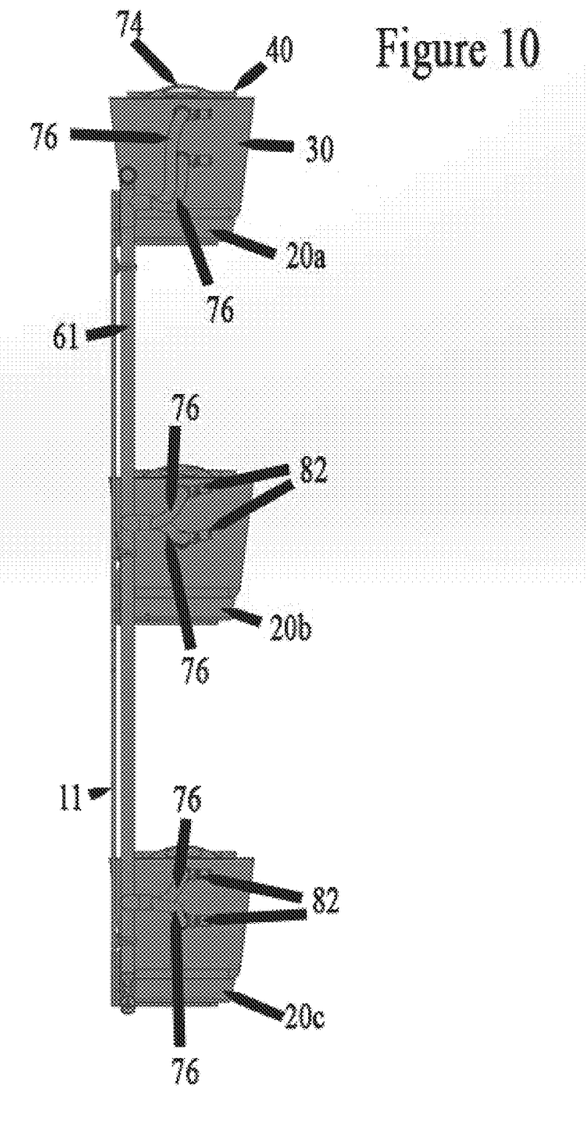
FIG. 10 is an end view of the plant irrigation system seen in FIG. 2.
Figure 11:
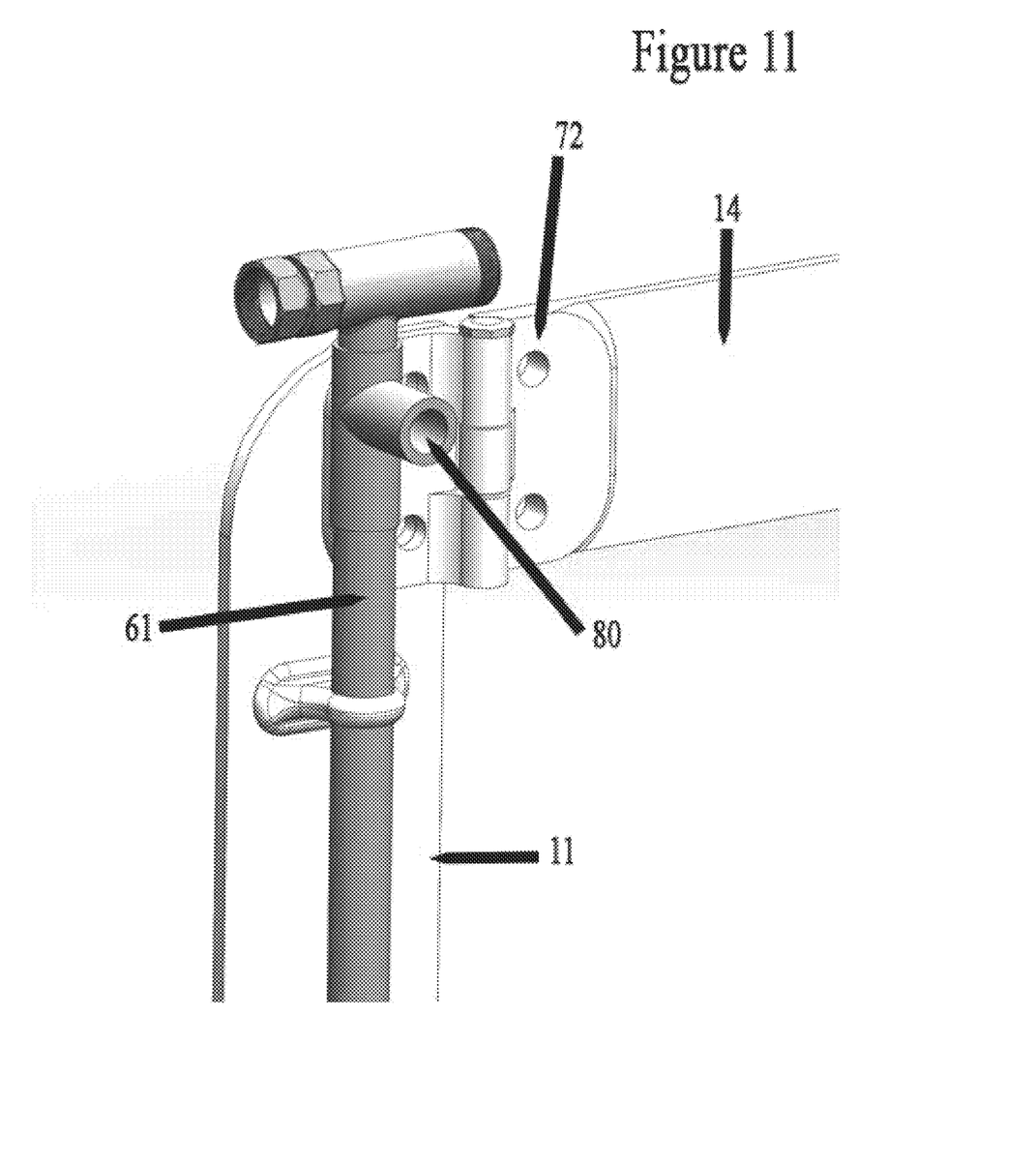
FIG. 11 is a magnified view of a portion of the support structure seen in FIG. 5.

A second embodiment of the irrigation system may be seen in FIGS. 2-11. In this embodiment, the irrigation system comprises a flexible or malleable assembly hose 76 coupled between each of the housing assemblies 20a-20d and the main artery 61. Each assembly hose 76 is coupled to a means to distribute the incoming flow of water to a pair of upper irrigation pipes 63, 63' and a pair of lower irrigation pipes 64, 64' via a spit junction or valve as is known in the art. Each assembly hose 76 comprises a hose valve 80 as seen in FIG. 8 for adjusting the flow of water delivered from the main artery 61 to a respective hosing assembly 20a-20d. Additionally, each housing assembly 20a-20d comprises a plurality of irrigation pipe valves 82 for each of the corresponding upper irrigation pipes 63, 63' and lower irrigation pipes 64, 64'. Each of the plurality of irrigation pipe valves 82 can be manipulated to adjust the rate or amount of water flowing into the irrigation pipe 63, 63', 64, 64' coupled to that specific irrigation pipe valve 82.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An apparatus for efficient irrigation comprising:
  a plurality of housing assemblies; and
  an irrigation system inserted into at least one of the plurality of housing assemblies,
  wherein the irrigation system inserted into at least one of the plurality of housing assemblies comprises at least one upper irrigation pipe disposed at a first height and at least one lower irrigation pipe disposed at a second height within the at least one of the plurality of housing assemblies, the first height of the at least one upper irrigation pipe being above the second height of the at least one lower irrigation pipe, and
  wherein each of the plurality of housing assemblies comprises:
    an exterior shell;
    an interior shell nested within the exterior shell; and
    a cavity disposed between the exterior shell and the interior shell.

2. The apparatus of claim 1 wherein the irrigation system further comprises:
  a main artery; and
  a plurality of angled manifolds coupled to the main artery,
    wherein each of the plurality of angled manifolds are orientated at an angle with respect to the main artery,
    wherein each upper irrigation pipe disposed at a first height within each of the plurality of housing assemblies is coupled to an upper end of each of the corresponding plurality of angled manifolds, and
    wherein each lower irrigation pipe disposed at a second height within each of the plurality of housing assemblies is coupled to a lower end of each of the plurality of angled manifolds.

3. The apparatus of claim 2 wherein each of the plurality of angled manifolds comprises an upper irrigation pipe valve disposed in its upper end and a lower irrigation pipe valve disposed in its lower end.

4. The apparatus of claim 2 further comprising at least one check valve disposed in the main artery.

5. The apparatus of claim 1 wherein the irrigation system further comprises:
  a main artery;
  an assembly hose coupled to the main artery at one end; and
  a plurality of irrigation pipe valves disposed in the main artery,
    wherein at least two of the plurality of irrigation pipe valves correspond to the at least one upper irrigation pipe and the at least one lower irrigation pipe, repectively.

6. The apparatus of claim 1 wherein the exterior shell further comprises an exterior wall contour and wherein the interior shell further comprises an interior wall contour, wherein the exterior wall contour and the interior wall contour are configured to interact and locate the interior shell within the exterior shell.

7. The apparatus of claim 1 further comprising a plurality of shell feet disposed between the interior shell and the exterior shell.

8. The apparatus of claim 1 wherein the interior shell and the exterior shell each comprise a plurality of drainage apertures.

9. The apparatus of claim 1 wherein the interior shell comprises a plurality of handles disposed at each end.

\* \* \* \* \*